US011192549B2

(12) United States Patent
Lanfranco (10) Patent No.: US 11,192,549 B2
(45) Date of Patent: Dec. 7, 2021

(54) WARNING AND ADJUSTING THE LONGITUDINAL SPEED OF A MOTOR VEHICLE BASED ON THE RECOGNIZED ROAD TRAFFIC LIGHTS

(71) Applicant: C.R.F. SOCIETA' CONSORTILE PER AZIONI, Orbassano (IT)

(72) Inventor: Claudio Lanfranco, Orbassano (IT)

(73) Assignee: C.R.F. SOCIETA' CONSORTILE PER AZIONI, Orbassano (IT)

(*) Notice: Subject to any disclaimer, the term of this patent is extended or adjusted under 35 U.S.C. 154(b) by 74 days.

(21) Appl. No.: 16/760,823

(22) PCT Filed: Nov. 9, 2018

(86) PCT No.: PCT/IB2018/058838
§ 371 (c)(1),
(2) Date: Apr. 30, 2020

(87) PCT Pub. No.: WO2019/092658
PCT Pub. Date: May 16, 2019

(65) Prior Publication Data
US 2021/0221370 A1    Jul. 22, 2021

(30) Foreign Application Priority Data
Nov. 10, 2017    (IT) .................... 102017000128738

(51) Int. Cl.
*B60W 40/08* (2012.01)
*B60W 30/16* (2020.01)
(Continued)

(52) U.S. Cl.
CPC ........ *B60W 30/162* (2013.01); *B60W 30/146* (2013.01); *B60W 30/181* (2013.01);
(Continued)

(58) Field of Classification Search
CPC ............ B60W 30/162; B60W 30/146; B60W 30/181; B60W 40/08; B60W 50/16;
(Continued)

(56) References Cited

U.S. PATENT DOCUMENTS 9,305,460 B1    4/2016  Aza
2006/0271265 A1*  11/2006  Kawazoe ............ B60W 30/146
                                                701/93
(Continued)

FOREIGN PATENT DOCUMENTS

WO    WO-2015093823 A1    6/2015

OTHER PUBLICATIONS

International Search Report and Written Opinion of the International Searching Authority issued in PCT/IB2018/058838 dated Feb. 27, 2019; ISA/SE.
(Continued)

*Primary Examiner* — Jeff A Burke
*Assistant Examiner* — Sihar A Karwan
(74) *Attorney, Agent, or Firm* — Harness, Dickey & Pierce, P.L.C.

(57) ABSTRACT

An automotive adaptive cruise control system for a host motor vehicle configured to operate in at least two different operating modes comprising a first operating mode, in which a current speed of the host vehicle is controlled to maintain a cruise speed, and a second operating mode, in which the current speed of the host vehicle is controlled to maintain a cruise distance to a leading vehicle, wherein the system is configured to:
 detect approaching to a traffic light and determine a light signal emitted thereby,
 signal to the driver the presence of the detected traffic light and the determined light signal,
 if the traffic light emits a red or amber light signal, estimating a driver reaction time, determining a higher
(Continued)

threshold distance and a lower threshold distance from the traffic light, and warning the driver of the host vehicle of the need to slow it down if, after the driver reaction time has elapsed:
i) the host motor vehicle has not decreased its speed by more than a calibratable threshold,
ii) the current speed of the host vehicle is higher than a minimum speed,
iii) either the distance of the host vehicle from the traffic light is lower than the higher threshold distance and the light signal emitted by the traffic light is red, or the distance of the host vehicle from the traffic light is between the higher and lower threshold distances and the light signal emitted by the traffic light is amber, and
iv) a service brake of the host vehicle is unoperated.

6 Claims, 9 Drawing Sheets

(51) Int. Cl.
| | |
|---|---|
| *B60W 30/14* | (2006.01) |
| *B60W 30/18* | (2012.01) |
| *B60W 50/16* | (2020.01) |
| *G06F 17/11* | (2006.01) |
| *G06K 9/00* | (2006.01) |
| *B60W 50/14* | (2020.01) |

(52) U.S. Cl.
CPC ............ *B60W 40/08* (2013.01); *B60W 50/16* (2013.01); *G06F 17/11* (2013.01); *G06K 9/00825* (2013.01); *B60W 2040/0863* (2013.01); *B60W 2050/143* (2013.01); *B60W 2050/146* (2013.01); *B60W 2555/60* (2020.02)

(58) Field of Classification Search
CPC ..... B60W 2555/60; B60W 2040/0863; B60W 2050/143; B60W 2050/146; B60W 2540/00; B60W 2540/30; B60W 2552/40; B60W 30/14; B60W 50/14; G06F 17/11; G06K 9/00825

See application file for complete search history.

(56) References Cited

U.S. PATENT DOCUMENTS

| | | |
|---|---|---|
| 2010/0106413 A1 | 4/2010 | Mudalige |
| 2012/0146811 A1 | 6/2012 | Chou et al. |
| 2014/0240114 A1* | 8/2014 | Waeller ................ B60W 50/14 340/435 |
| 2014/0309864 A1* | 10/2014 | Ricci ................... B60N 2/0244 701/36 |
| 2016/0318490 A1 | 11/2016 | Shalom |
| 2017/0080930 A1 | 3/2017 | Morimoto et al. |
| 2017/0101107 A1 | 4/2017 | Milch et al. |

OTHER PUBLICATIONS

International Preliminary Report on Patentability issued in PCT/IB2018/058838 dated Oct. 30, 2019.

* cited by examiner

WARNING AND ADJUSTING THE LONGITUDINAL SPEED OF A MOTOR VEHICLE BASED ON THE RECOGNIZED ROAD TRAFFIC LIGHTS

CROSS-REFERENCE TO RELATED APPLICATIONS

This application is a U.S. National Phase Application under 35 U.S.C. 371 of International Application No. PCT/IB2018/058838, filed on Nov. 9, 2018, which claims the benefit of Italian patent application No. 102017000128738 filed on Nov. 10, 2017. The entire disclosures of the above-identified applications are incorporated herein by reference.

TECHNICAL FIELD OF THE INVENTION

The present invention relates in general to motor vehicle driver assistance, and in particular to warning and adjusting the longitudinal speed of a motor vehicle based on recognized traffic lights.

The present invention finds application in any type of road motor vehicle, whether it is used for the transport of people, such as a car, a bus, a camper, etc., or for the transport of goods, such as an industrial motor vehicle (truck, road train, articulated truck, etc.) or light or medium-heavy commercial motor vehicle (van, closed vehicle, cabbed vehicle, etc.).

STATE OF THE ART

As is known, in recent years motor vehicle manufacturers have invested considerable resources in research into Advanced Driver Assistance Systems (ADAS) to improve driving safety and comfort.

For this reason, and because it will help to achieve the targets imposed by the European Union for the reduction of road accidents, ADAS is one of the fastest growing segments in the automotive sector and is set to become increasingly popular in the coming years.

The safety features of these systems are designed to avoid collisions and accidents by offering technologies which alert drivers to potential problems, or to avoid collisions by implementing safety measures and taking control of vehicles. The adaptive features can automate lighting, provide adaptive cruise control, automate braking, incorporate GPS/traffic information, connect smartphones, alert drivers of other vehicles to hazards, keep drivers in the correct lane, or show what is in blind spots.

ADAS technology is based on camera/vision systems, sensory systems, automotive data networks, vehicle-to-vehicle (V2V) or vehicle-to-infrastructure (V2I) communication systems. Next-generation ADAS systems will increasingly use wireless connectivity to add value to V2V or V2I communication.

According to studies conducted by Accident Research of the German Association of Insurers (GDV), lane departure warning systems alone can prevent up to 15% of road accidents, while intersection assistance can prevent up to 35% of road accidents.

Technological developments such as integration of radar and cameras, and the combined use of sensors between multiple applications, are expected to provide cost reductions that could lead to a more significant penetration of ADAS in the small vehicle market by 2018.

With regard to the automotive Adaptive Cruise Control (ACC) system, as is known, it is designed to act in a combined manner on the engine and the braking system of the host motor vehicle so as to accelerate and decelerate the host motor vehicle to enable it to maintain a cruising speed or a cruising distance that can be set and adjusted by the driver.

Figure 1:
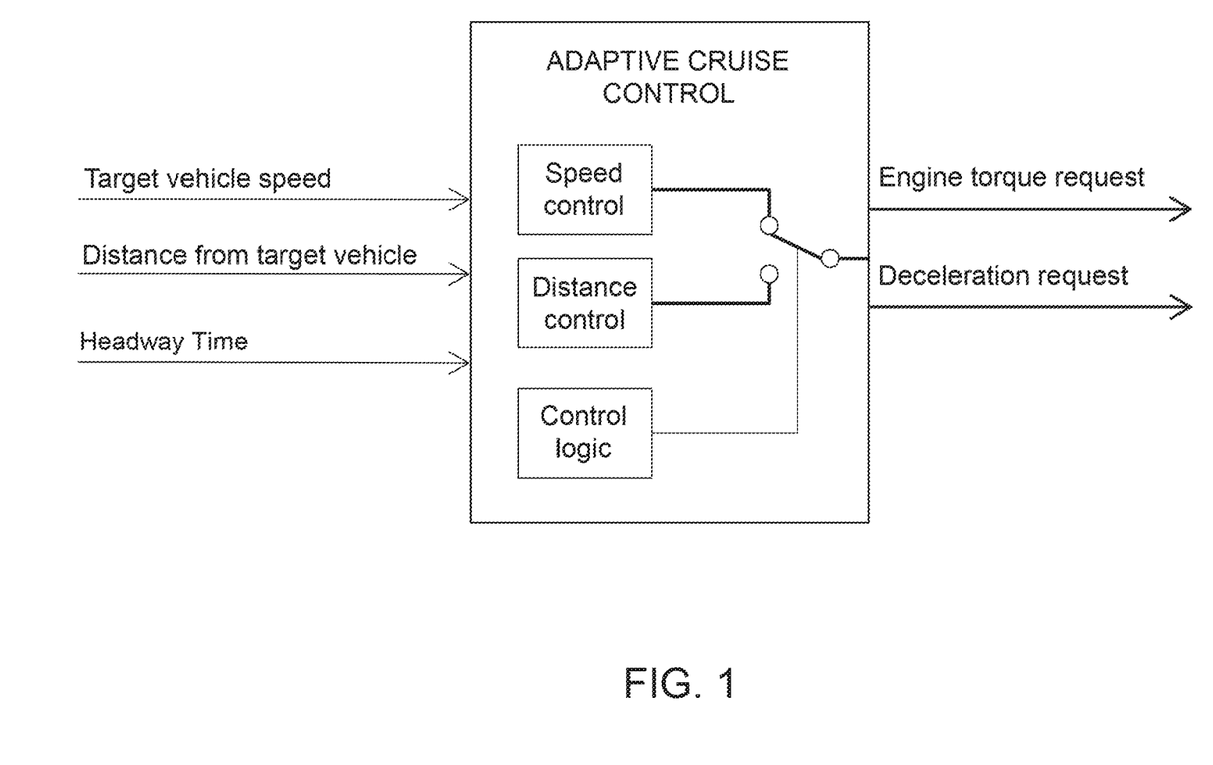
FIGS. 1 and 2 show functional block diagrams of operations carried out by an automotive electronic control unit to implement a prior art ACC functionality.

FIG. 1 shows a basic functional block diagram of the operations implemented by an automotive electronic control unit (ECU) to achieve prior art ACC functionality.

As shown in FIG. 1, the prior art ACC functionality operates based on various input quantities, including the current speed of the host motor vehicle, a cruise speed of the host motor vehicle set by the driver, the current relative speed and distance of the host motor vehicle relative to a leading motor vehicle, and the cruise distance of the host motor vehicle from a leading motor vehicle set by the driver through the setting of the so-called Headway Time, which represents, in terms of time rather than distance, the cruise distance that the driver of the host motor vehicle wishes to maintain relative to the leading motor vehicle, and which may not be less than a given value representing the safety distance, which, as is known, depends on the current speed of the host motor vehicle and on an average driver reaction time.

The headway time is generally selectable by the driver of the host motor vehicle from a range of stored values resulting in a longer or shorter cruise distance of the host motor vehicle from a leading motor vehicle. A value of two seconds is generally considered sufficient for most drivers to prevent a rear-end collision with the leading motor vehicle.

As shown in FIG. 1, the ACC functionality is designed to operate in two different modes, a cruise mode, in which the current speed of the host motor vehicle is controlled to maintain a driver-settable cruise speed, and a follow mode, in which the current speed of the host motor vehicle is controlled to maintain a driver-settable cruise distance from a leading motor vehicle.

To do so, the ACC functionality is designed to implement independent speed and distance controls that are selectable by a control logic designed to cause the switch from the cruise mode to the follow mode in response to the detection of a leading motor vehicle being below a predetermined distance from the host motor vehicle, and the return to the cruise mode in response to the detection of no leading motor vehicle being below a predetermined distance from the host motor vehicle.

In the two above-described operating modes, the ACC functionality operates based on control parameters or quantities, which include, inter alia, the host motor vehicle cruise speed and distance, as well as the acceleration/deceleration profile to be achieved by the host motor vehicle in order to maintain the cruise speed and distance, and are designed to have, under normal operating conditions, driver-settable nominal values, such as the cruise speed and distance, or pre-determined values stored in the ECU, such as the acceleration/deceleration profile, or computed based thereon.

Figure 2:
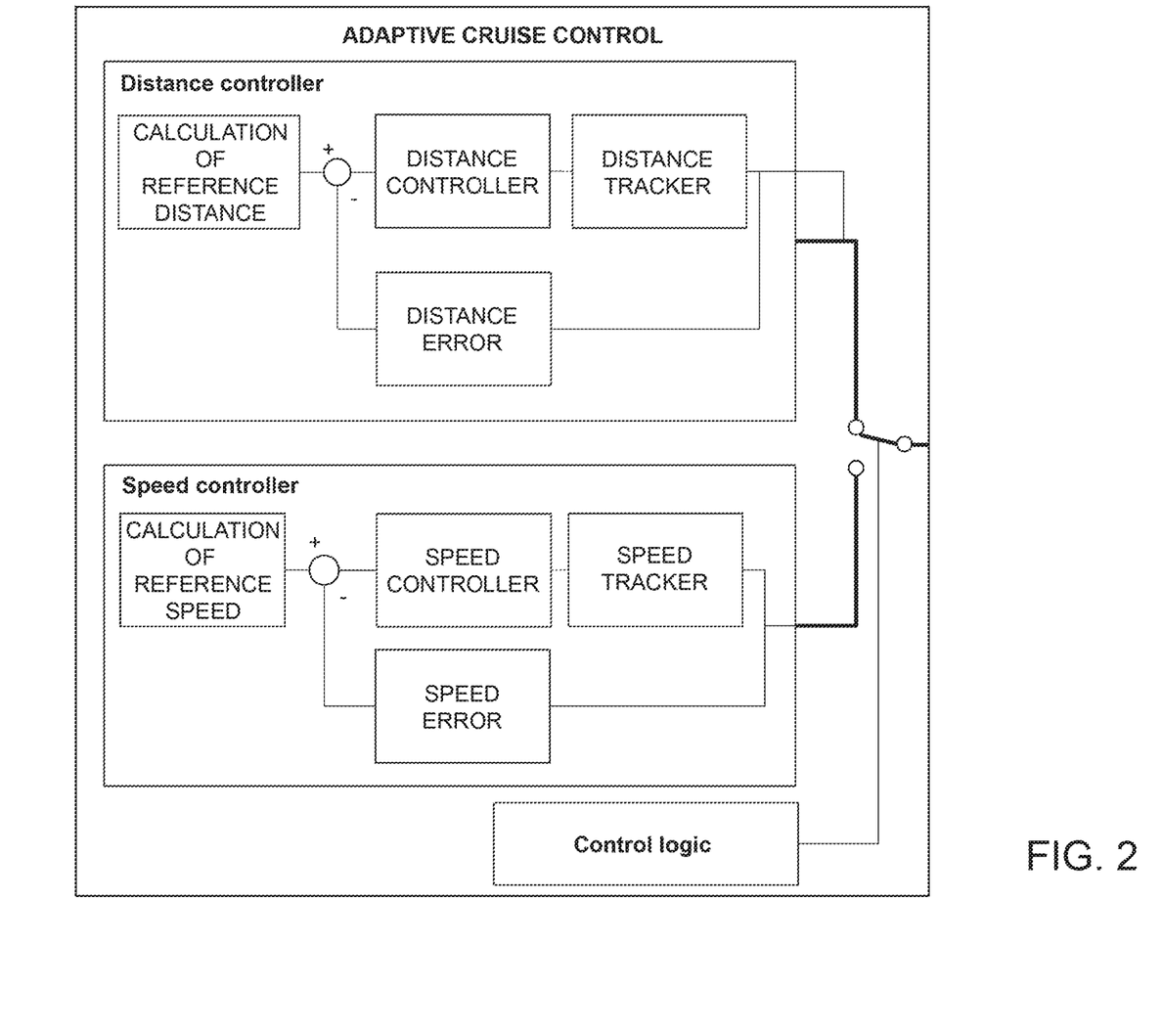

FIG. 2 shows more detailed functional block diagrams for the speed and distance controls, which operate in a closed loop based on an error between a current value and a reference value of the controlled quantity (speed or distance) in order to eliminate the error between the two values and thus cause the current value to follow the reference value as closely as possible.

US 2010/106413 A1 describes a configurable time-to-stop warning system of a motor vehicle to send an alarm warning to a driver of a motor vehicle relative to an imminent stop position from the motor vehicle along the transit road. Wireless messages transmitted from a remote entity to the vehicle are received. The messages contain information such as position data and other data affecting stopping of the vehicle. GPS data relating to instantaneous vehicle position in the road of travel is retrieved. A travel time until the vehicle reaches the stopping location is determined. A determination is made whether the driver has initiated braking. An advance notice period is determined for issuing a warning to the driver to decelerate the vehicle comprising the travel time plus a predetermined reaction time plus a selectable driver configured increment. A sensory warning to the driver of the vehicle is actuated if the advance notice period is less than the travel time and the driver has not initiated braking.

US 2017/080930 A1 discloses a vehicle control apparatus applicable to a vehicle having at least one device configured to acquire a road situation information from an outside of the vehicle. The apparatus determines whether or not a particular situation regarding a vehicle traveling occurs on the basis of the road situation information. The particular situation being a situation that a driver of the vehicle should be alerted. The apparatus can perform an informing for alerting the driver and execute a cruise control for causing the vehicle to travel automatically without an operation of an acceleration operator of the vehicle. The apparatus performs the informing when the particular situation occurs, the cruise control is not executed and the acceleration operator is operated. The apparatus performs the informing when the particular situation occurs and the cruise control is executed, independently of whether or not the acceleration operator is operated.

OBJECT AND SUMMARY OF THE INVENTION

The Applicant has verified that automotive sensory systems are available including specific sensors that allow an automotive electronic control unit to recognise the approach of a motor vehicle to a road junction controlled by a traffic light system.

Therefore, the present invention aims to improve the ACC functionality by also integrating this technology so as to allow recognition of the approach of a motor vehicle to a junction controlled by a traffic light system in order to properly alert the driver of the motor vehicle and possibly to define when and how the ACC functionality can control the longitudinal speed of the motor vehicle so as to stop it comfortably and suitably to avoid the passage of the motor vehicle at the junction with a red or amber traffic light.

According to the present invention, an automotive adaptive cruise control system is provided, as claimed in the appended claims.

DETAILED DESCRIPTION OF PREFERRED EMBODIMENTS OF THE INVENTION

The present invention will now be described in detail with reference to the appended figures to enable a person skilled in the art to make and use it. Various modifications to the embodiments described will be immediately apparent to the person skilled in the art and the general principles described may be applied to other embodiments and applications while remaining within the sphere of protection of the present invention, as defined in the appended claims. The present invention should not therefore, be considered limited to the embodiments described and illustrated, but given a broader scope of protection according to the characteristics described and claimed.

Figure 3:
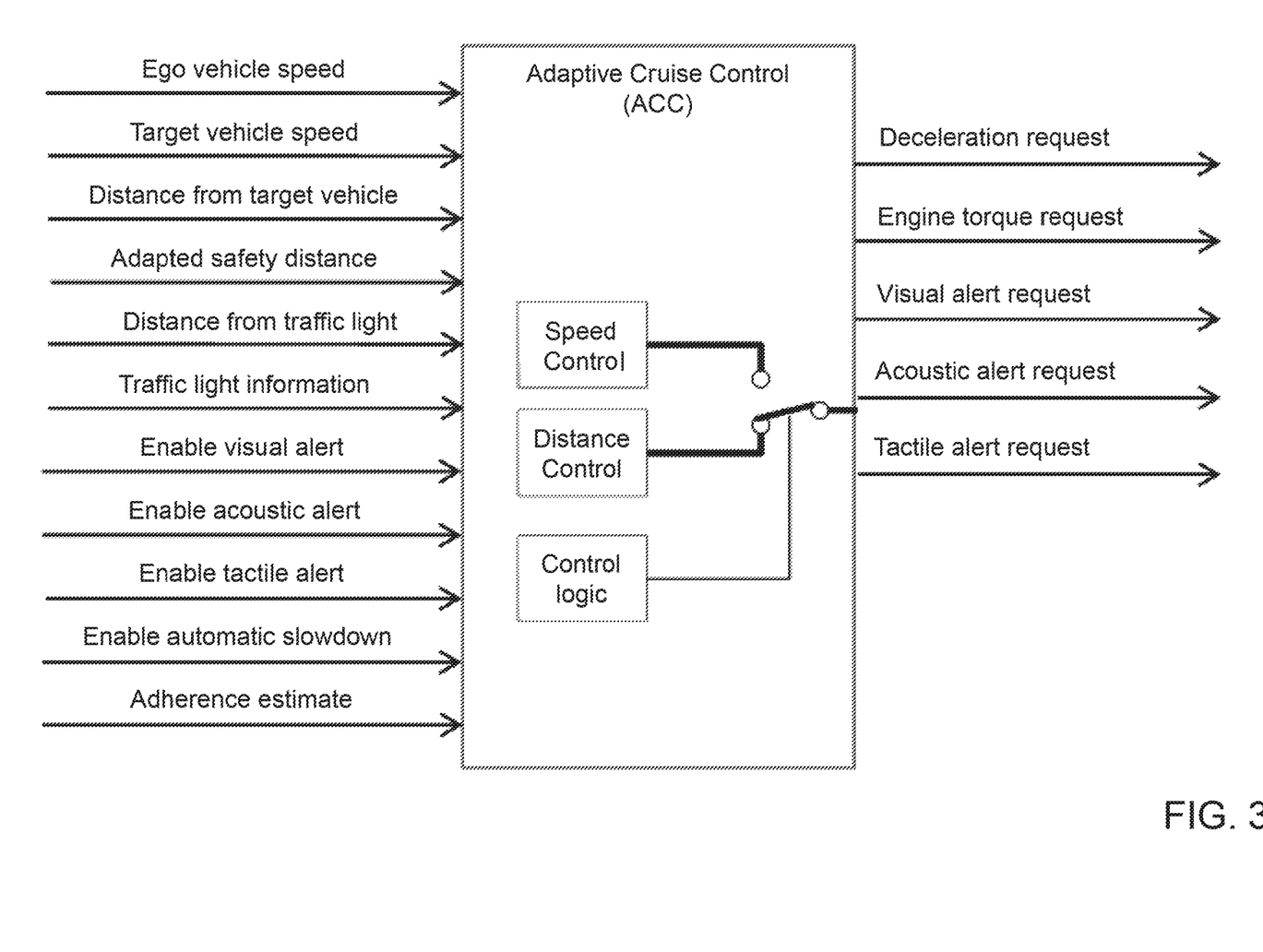
FIG. 3 shows functional block diagrams of operations carried out by an automotive electronic control unit to implement the ACC functionality according to the present invention.

FIG. 3 shows a basic functional block diagram of operations carried out by an automotive electronic control unit to implement the ACC functionality according to the present invention, which essentially provides for computing, in response to detecting, by a suitable sensor, a motor vehicle approaching a road junction controlled by a traffic light system (fixed or mobile), timings of warning and of any motor vehicle speed adjustment, taking account of the physical and environmental parameters measurable by the longitudinal control system of the motor vehicle.

As can be appreciated from a comparison with the block diagram shown in FIG. 1, compared to the prior art ACC functionality, the ACC functionality according to the present invention is designed to generate deceleration and engine torque requests, visual, acoustic and possibly also tactile warnings based on input data determined by the ECU based on the signals provided by the sensory system (radar, lidar, cameras) of the motor vehicle and/or stored in the ECU, and indicative of the following quantities: current speed of the host motor vehicle, current speed of a leading motor vehicle, current distance of the hot motor vehicle from a leading motor vehicle, adapted safety distance of the host motor vehicle, current distance of the host motor vehicle from a traffic light, estimation of the road adherence of the tyres of the host motor vehicle, as well as in the presence of the following indicators: visual, acoustic, and tactile warnings, and automatic slow-down.

The deceleration and engine torque requests to the control system of the host motor are influenced by the current speed of the host motor vehicle, its distance from the traffic light, and an adapted safety distance DSA, which is settable by the driver of the host motor vehicle and is adjustable based on values learned during a manual driving mode and on the road adherence estimate.

Figure 4:
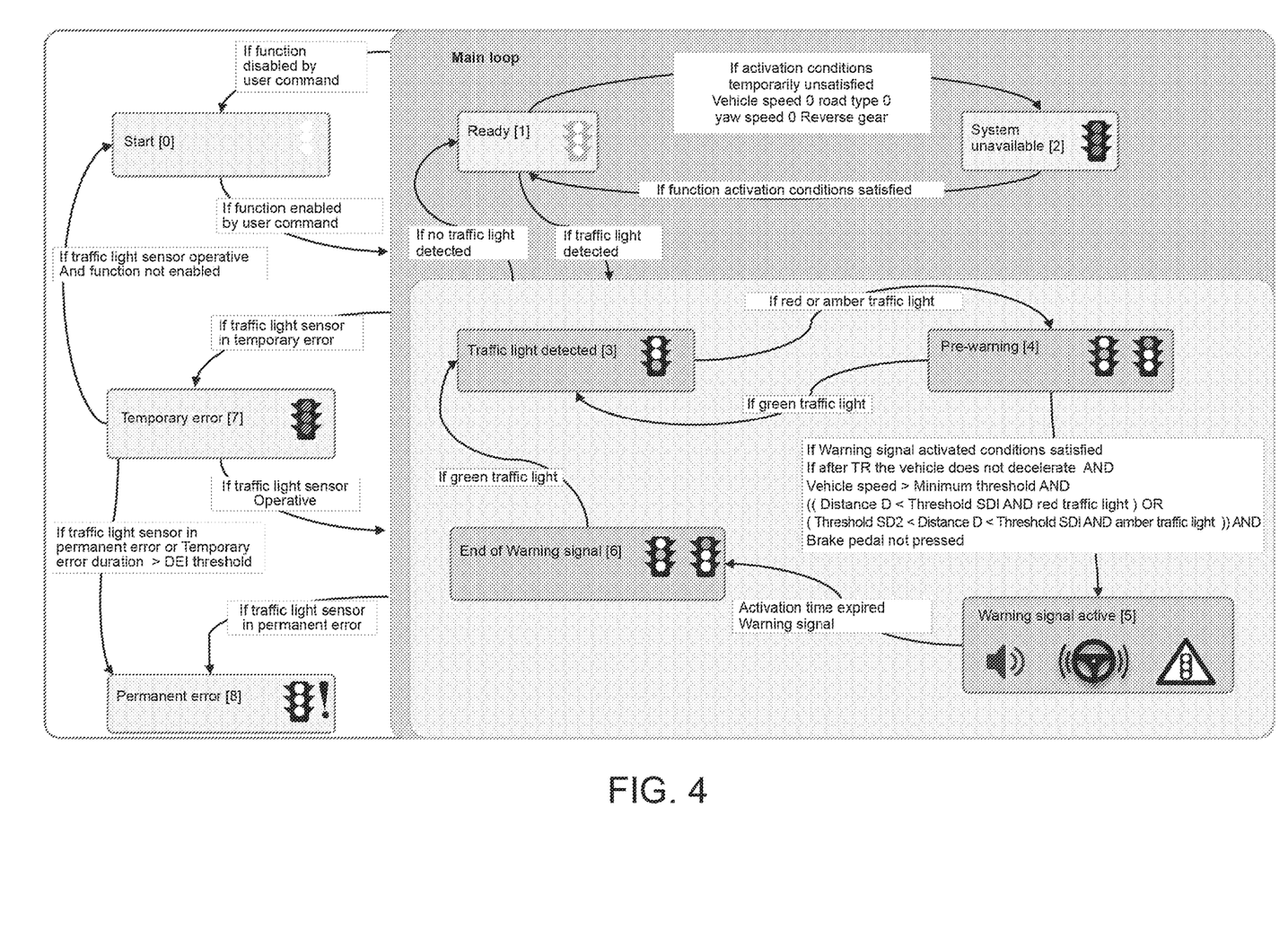
FIG. 4 shows a state diagram of a state machine describing the warning management in a motor vehicle approaching a road section regulated by a traffic light control.

FIG. 4 shows a self-explanatory state diagram of a state machine describing the logical flow of warning a driver of a motor vehicle when the motor vehicle is approaching a road junction controlled by a traffic light system.

Reaching the 'Active Warning Signal' status [5] may result in different actions as provided for by each specific application. In a reduced version, the ACC functionality only alerts the driver of the motor vehicle approaching a road junction controlled by a traffic light system by means of a visual, acoustic, and/or tactile signal, while in an advanced version, the ACC functionality also progressively reduces the motor vehicle speed in order to (attempt to) stop it near the detected road traffic light system.

More specifically, when the automotive electronic control unit detects the presence of a traffic light system based on signals from an automotive sensory system, the state machine evolves to a "Detected Traffic Light" status [3], in which the driver of the host motor vehicle is immediately warned of the detection of the presence of a traffic light system ahead. If it is detected that the traffic light system is emitting a red or amber light signal, the state machine evolves to a "Pre-Warning" status [4], in which the reaction of the driver to the warning of the detection of the presence of a traffic light system ahead is verified.

In particular, the reaction of the driver to the warning of the presence of the traffic light system is verified by computing (estimating) a driver reaction time TR based on the driving style, and two threshold distances SD1 and SD2, one higher and one lower, in the manner described in detail below, which are used to cause the evolution or not of the state machine from the 'Pre-Warning' [4] to the 'Active Warning Signal' [5] status, in which the driver is warned of the need to intervene on the controls of the host motor vehicle to slow it down so as to stop it near the traffic light system.

In particular, if after the driver reaction time TR has elapsed it is determined that:

the motor vehicle is found not to have decreased its speed by more than a calibratable threshold speed, which may conveniently be a function of the motor vehicle speed at the moment of the detection of the traffic light system, the motor speed vehicle is higher than a minimum speed, e.g., 30 km/h, the distance of the vehicle from the detected traffic light system is less than the higher threshold distance SD1 and the light signal emitted by the detected traffic light system is red, or the distance of the motor vehicle from the detected traffic light is between the higher and lower threshold distances SD1 and SD2 and the light emitted by the detected traffic light system is amber, and the service brake pedal of the motor vehicle is found not to have been pressed and, hence, the service brake of the motor vehicle is found not to have been activated, then the state machine evolves from the 'Pre-Warning' [4] to the 'Active Warning Signal' [5] status, in which the driver is warned of the need to intervene on the controls of the motor vehicle to slow it down so as to stop it near the detected traffic light system.

In the 'Active Warning Signal' status [5], the ACC functionality can also intervene on the engine and the braking system of the host motor vehicle in order to progressively reduce the speed thereof in order to (attempt to) stop it near the detected traffic light system.

Figure 5:
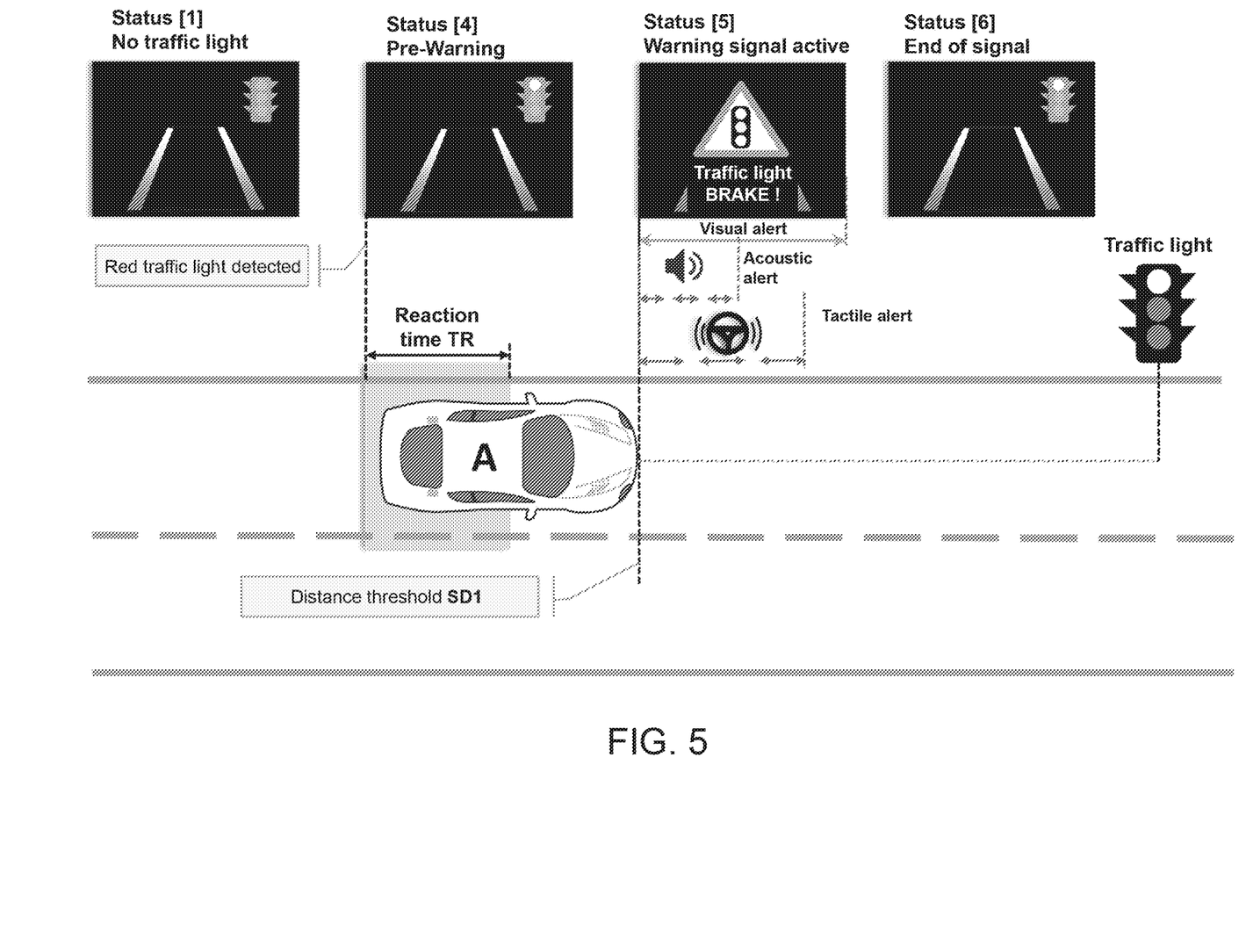
FIGS. 5, 6 and 7 show information sequences displayed on a display of an automotive infotainment system of a motor vehicle approaching a road junction controlled by a traffic light system.
Figure 6:
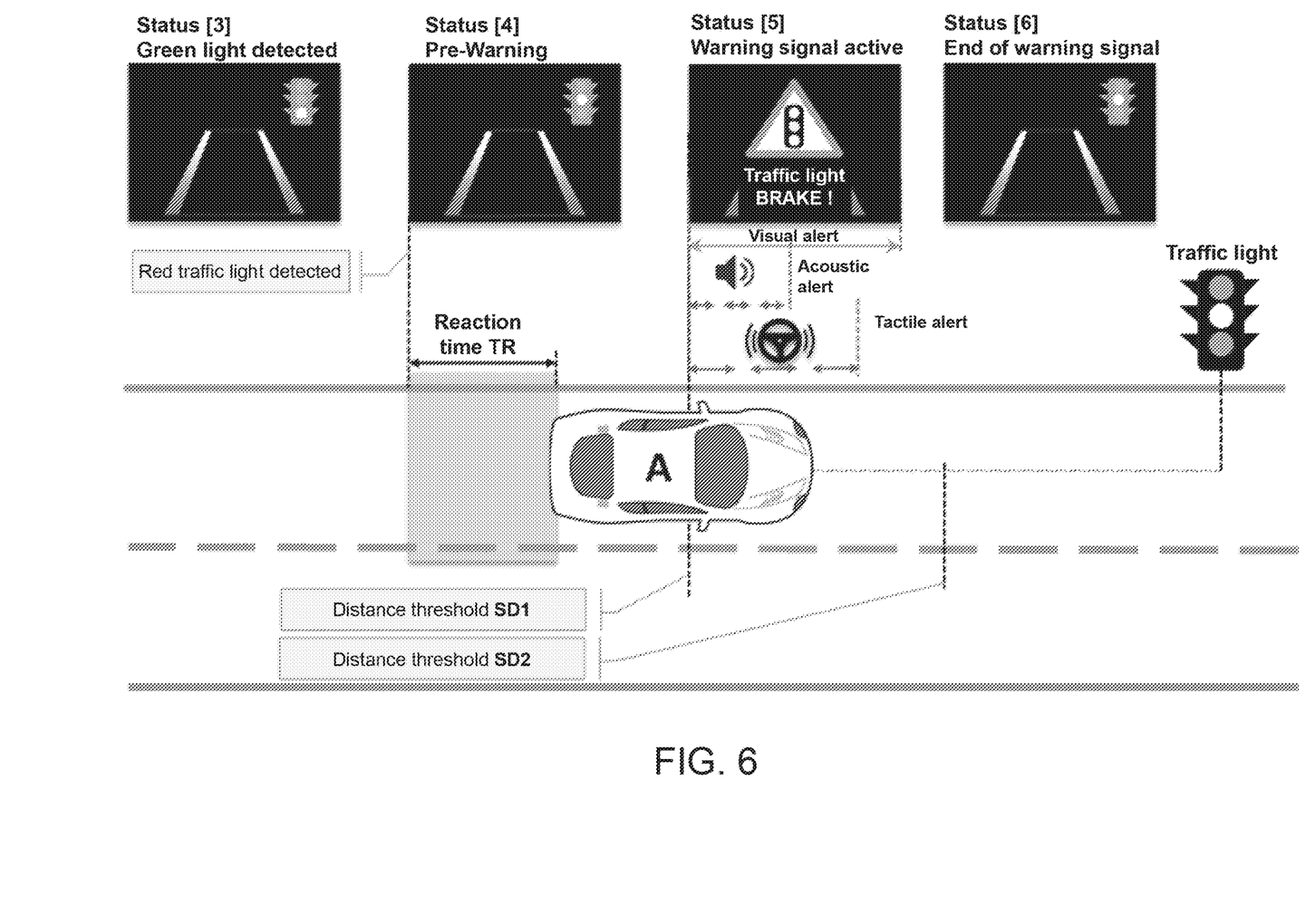
Figure 7:
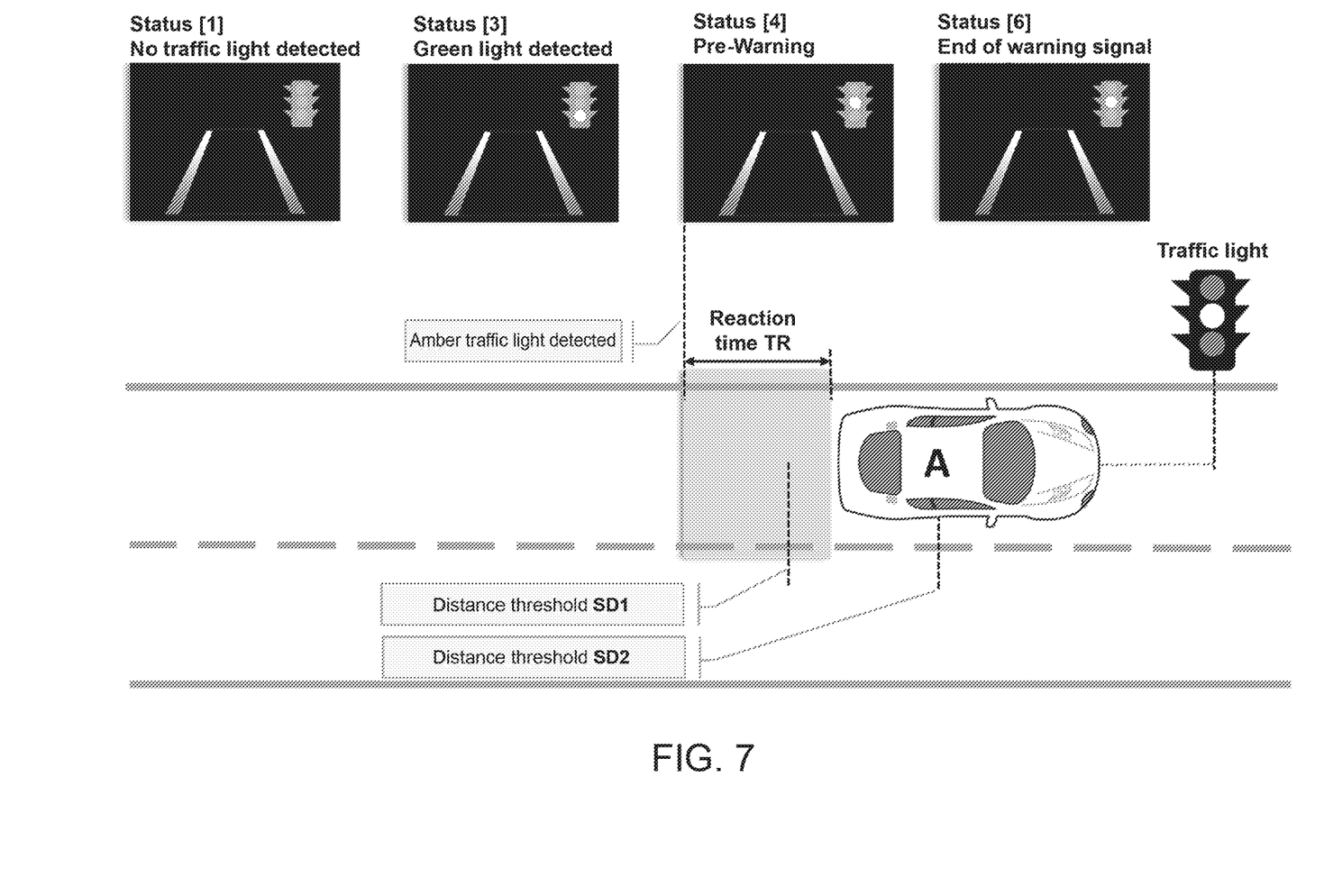

FIGS. 5, 6 and 7 exemplarily show indications displayed on a display of the infotainment system of the host motor vehicle when approaching a road junction controlled by a traffic light system.

In particular, FIG. 5 shows the information sequence displayed in the 'Active Warning Signal' status [5] when this is reached when a red traffic light is detected and at the end of the driver reaction time TR the host motor vehicle has not significantly decelerated and will therefore exceed the higher threshold distance SD1 from the detected traffic light system.

FIG. 6 shows the information sequence displayed in the 'Active Warning Signal' status [5] when this is reached when an amber traffic light is detected and at the end of the driver reaction time TR the host motor vehicle has not decelerated significantly, the higher distance threshold SD1 will be exceeded but the lower distance threshold SD2 from the detected traffic light system will not be exceeded.

Lastly, FIG. 7 shows the information sequence displayed in the 'Active Warning Signal' status [5] when this is reached when an amber traffic light is detected and at the end of the driver reaction time TR the host motor vehicle has not decelerated significantly, both the lower distance threshold SD1 and the higher distance threshold SD2 from the detected traffic light will be exceeded, and the subsequent evolution in the "Active Signalling End" status [6].

Figure 8:
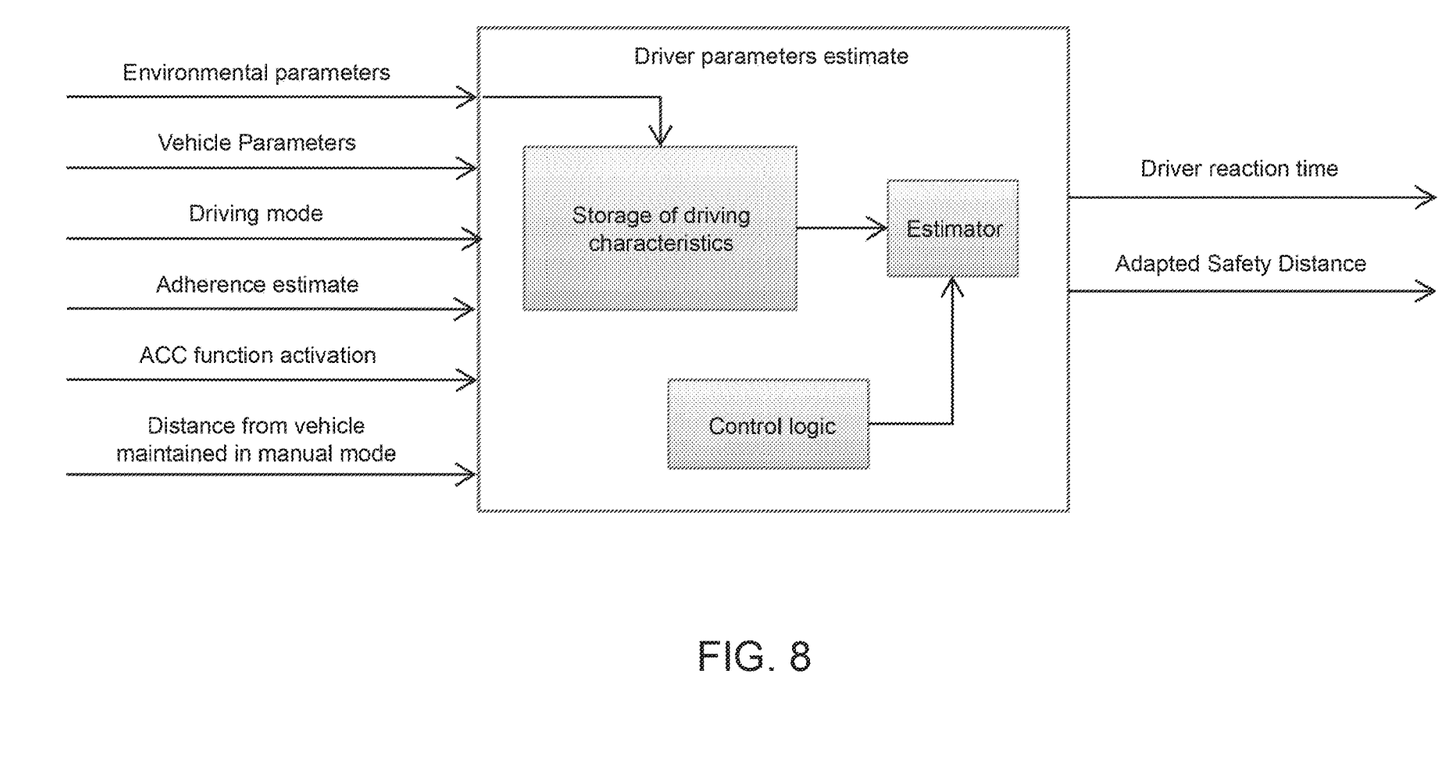
FIG. 8 shows a functional block diagram of the estimation of control parameters used in the ACC functionality according to the present invention.

FIG. 8 shows a functional block diagram implemented by the vehicle ECU of a driver-related parameter estimator designed to estimate the driver reaction time TR and the adapted safety distance SDA based on the driving style.

As shown in FIG. 8, the driver-related parameter estimator receives input data determined by the ECU based on signals from the sensory system (radar, lidar, cameras) of the host motor vehicle and/or stored in the ECU, and indicative of the following quantities: environmental quantities, automotive quantities, manual or automatic driving modes, which occur when the ACC functionality is disabled or, respectively, enabled, road adherence estimate, activation of the ACC functionality, and the distance of the host motor vehicle from a leading motor vehicle maintained by the driver during manual driving mode, i.e., when the ACC functionality is disabled.

The driver-related parameter estimator is designed to determine, based on the input data, and to store driving characteristics of the motor vehicle, such as the average distance (expressed in time) maintained relative to leading motor vehicles, average and maximum accelerations and decelerations and derived values, and then to estimate, based on the stored driving characteristics of the motor vehicle and on the control logic based on which switching from the cruise mode to the follow mode is caused and vice versa, the driver reaction time TR and the adapted safety distance SDA.

With regard to the higher and lower distance thresholds SD1 and SD2, these can for example be computed based on the following formulae, which are based on the assumption that the host motor vehicle decelerates with a uniform motion towards the traffic light system:

$$SD1 = (\text{motor vehicle speed})/(2 \cdot D1)$$

$$SD2 = (\text{motor vehicle speed})/(2 \cdot D2)$$

where D1 and D2 are the maximum attainable comfort deceleration and, respectively, the maximum attainable deceleration that are functions of a road adherence estimate and are dependent on the functional parameters of the host motor vehicle and on environmental parameters.

In particular, the maximum attainable comfort deceleration D1 and the maximum attainable deceleration D2 are calculated as described below with reference to the functional block diagram illustrated in FIG. 9.

Figure 9:
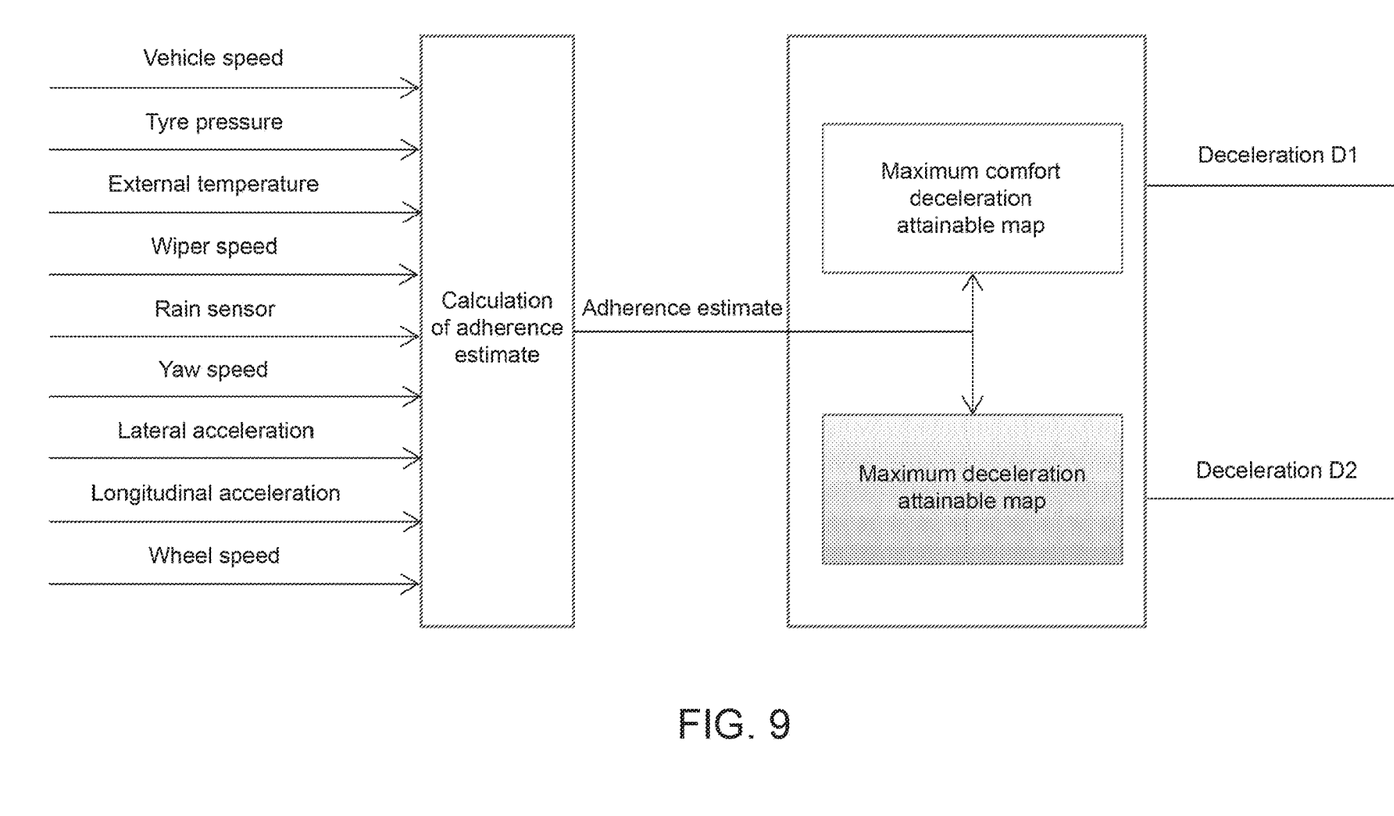
FIG. 9 shows a functional block diagram of computation of two deceleration values used in the ACC functionality according to the present invention.

As shown in FIG. 9, the road adherence of the host motor vehicle is first estimated based on input data determined by the ECU based on signals from the sensory system (radar, lidar, cameras) of the host motor vehicle and/or stored in the ECU, and indicative of the following quantities: current speed of the host motor vehicle, pressure of the tyres of the host motor vehicle, external temperature, wiper speed, rain rate measured by a rain sensor, a yaw speed of the host motor vehicle, the lateral acceleration of the host motor vehicle, the longitudinal acceleration of the host motor vehicle and the speed of the wheels of the host motor vehicle.

Based on the road adherence estimate and the current speed of the host motor vehicle, the maximum comfort deceleration attainable D1 and the maximum deceleration attainable D2 are then computed based on two associated one-dimensional maps that are calibrated during a system calibration phase.

Based on what has been described, the benefits that the present invention allow to achieve may be appreciated.

In particular, compared to the prior art ACC functionality, the present invention allows the ACC functionality to be improved by signalling the approach of the motor vehicle to a road junction controlled by a traffic light system and controlling the longitudinal speed of the motor vehicle so as to make a comfortable stop of the motor vehicle that avoids the passage of the motor vehicle at the junction with a red or amber traffic light.

The invention claimed is:

1. An automotive adaptive cruise control (ACC) system for a host motor vehicle (A) configured to operate in at least two different operating modes comprising:
   a first operating mode, in which a current speed of the host motor vehicle (A) is controlled to maintain a cruise speed, and a second operating mode, in which the current speed of the host motor vehicle (A) is controlled to maintain a cruise distance to a leading motor vehicle;
   the automotive adaptive cruise control (ACC) system is further configured to:
   detect approaching of the host motor vehicle (A) to a road traffic light system,
   determine a light signal emitted by the detected road traffic light system,
   signal to a driver of the host motor vehicle (A) the presence of the detected road traffic light system and possibly the light signal emitted by the detected road traffic light system,
   if the road traffic light system is determined to emit a red or amber light signal, estimating a driver reaction time (TR), determining a higher threshold distance (SD1) and a lower threshold distance (SD2) from the road traffic light system, and warning the driver of the host motor vehicle (A) of a need to intervene on the controls of the host motor vehicle (A) to slow it down if, after the driver reaction time (TR) has elapsed:
   i) the speed of the host motor vehicle (A) is determined to have decreased by a value lower than a speed reducing threshold,
   ii) the current speed of the host motor vehicle (A) is determined to be higher than a minimum speed,
   iii) either the distance of the host motor vehicle (A) from the road traffic light system is determined to be lower than the higher threshold distance (SD1) and the light signal emitted by the road traffic light system is determined to be red, or the distance of the host motor vehicle (A) from the road traffic light system is determined to be between the higher and lower threshold distances (SD1, SD2) and the light signal emitted by the traffic light system is determined to be amber, and
   iv) a service brake of the host motor vehicle (A) is determined to be unoperated;
   the automotive adaptive cruise control (ACC) system is further configured to:
   determine the driving characteristics of the host motor vehicle (A) during manual driving, and
   compute the driver reaction time (TR) based on the driving characteristics of the host motor vehicle (A) during manual driving;
   the automotive adaptive cruise control (ACC) system is further configured to control the current speed of the host motor vehicle (A) based on the distance of the host motor vehicle (A) from the detected road traffic light system and on an adapted safety distance (SDA) of the host motor vehicle (A);
   the automotive adaptive cruise control (ACC) system is further configured to compute the adapted safety distance (SDA) of the host motor vehicle (A) by:
   estimating road adherence of the host motor vehicle, and
   adapting a safety distance based on the determined driving characteristics of the host motor vehicle (A) during manual driving, and on the road adherence estimate;
   the automotive adaptive cruise control (ACC) system is further configured to compute the driver reaction time (TR) and the adapted safety distance (SDA) based on: environmental quantities, automotive quantities, driving mode, road adherence estimate, activation of the automotive adaptive cruise control (ACC) functionality of the host motor vehicle (A);
   the automotive adaptive cruise control (ACC) system is further configured to compute the higher and lower threshold distances (SD1, SD2) based on a maximum attainable comfort deceleration (D1) and a maximum attainable deceleration (D2) which are functions of the road adherence estimate of the host motor vehicle (A) and depend on automotive and environment quantities;
   the automotive adaptive cruise control (ACC) system is further configured to compute the maximum attainable comfort deceleration (D1) and the maximum attainable deceleration (D2) by:
   estimating road adherence of the host motor vehicle (A), and
   computing the maximum attainable comfort deceleration (D1) and the maximum attainable deceleration (D2) based on a maximum attainable comfort deceleration map and on a maximum attainable deceleration map, and on the road adherence estimate of the host motor vehicle (A).

2. The automotive adaptive cruise control (ACC) system of claim 1, further configured to compute the higher and lower threshold distances (SD1, SD2) based on the following formulas, which are based on the assumption that the host motor vehicle (A) uniformly decelerates while moving towards the traffic light system:

$$SD1 = (\text{motor vehicle speed})^2 / (2 \cdot D1)$$

$$SD2 = (\text{motor vehicle speed})^2 / (2 \cdot D2)$$

where D1 and D2 are the maximum attainable comfort deceleration and the maximum attainable deceleration, respectively.

3. The automotive adaptive cruise control (ACC) system of claim 1, further configured to:
   adjust the speed of the host motor vehicle (A) with the target of stopping it at the detected road traffic light system when the road traffic light system is determined to emit a red or amber light signal, and the conditions i) to iv) are determined to be met after the driver reaction time (TR) has elapsed.

4. The automotive adaptive cruise control (ACC) system according to claim 1, further configured to compute the speed reducing threshold based on the speed of the host motor vehicle (A) when the traffic light system is detected.

5. A motor vehicle (A) comprising the automotive adaptive cruise control (ACC) system of claim 1.

6. A non-transitory computer readable medium storing software loadable in an automotive electronic control unit and designed to cause, when executed, the automotive electronic control unit to implement the automotive adaptive cruise control (ACC) system of claim 1.

* * * * *